United States Patent [19]

Parr et al.

[11] Patent Number: 5,747,886
[45] Date of Patent: May 5, 1998

[54] PNEUMATIC ANTITHEFT APPARATUS WITH ALARM

[76] Inventors: William Parr, 51 Trinity St., Newton, N.J. 07860; Harry L. Davis, Box 361, Hamburg, N.J. 07419

[21] Appl. No.: 800,756

[22] Filed: Feb. 14, 1997

Related U.S. Application Data

[63] Continuation-in-part of Ser. No. 389,708, Feb. 2, 1995, abandoned.

[51] Int. Cl.⁶ ................................................. B60T 17/16
[52] U.S. Cl. ........................ 307/10.2; 303/89; 188/353; 180/287; 340/425.5
[58] Field of Search ............................. 307/10.2, 10.3, 307/10.4, 10.5; 188/353; 303/89; 180/287, 288, 289; 364/426.01, 426.023; 340/425.5, 426, 438, 450, 450.1, 451, 452

[56] References Cited

U.S. PATENT DOCUMENTS

| | | | |
|---|---|---|---|
| 2,979,364 | 4/1961 | Putnam | 340/431 |
| 3,579,285 | 5/1971 | Verdier | 307/10.2 |
| 3,585,327 | 6/1971 | Farmery | 200/83 |
| 3,684,049 | 8/1972 | Kimura | 303/89 |
| 3,753,601 | 8/1973 | Hensley | 303/84 |
| 3,800,279 | 3/1974 | Thompson | 340/65 |
| 3,973,508 | 8/1976 | Stevenson et al. | 303/89 |
| 3,973,805 | 8/1976 | Stevenson et al. | 303/89 |
| 4,196,939 | 4/1980 | Kavis | 303/89 |
| 4,495,910 | 1/1985 | Taylor | 123/198 |
| 4,546,846 | 10/1985 | Myers | 180/287 |
| 4,633,686 | 1/1987 | Carr | 70/179 |
| 5,078,456 | 1/1992 | Cox | 303/89 |
| 5,145,240 | 9/1992 | Harless et al. | 303/89 |
| 5,363,086 | 11/1994 | Rios | 340/426 |
| 5,378,929 | 1/1995 | Mor et al. | 303/89 |
| 5,392,876 | 2/1995 | Linares | 180/287 |
| 5,413,197 | 5/1995 | Baer et al. | 188/353 |
| 5,570,078 | 10/1996 | Wayenberg | 340/426 |
| 5,570,756 | 11/1996 | Hatcher | 180/287 |

*Primary Examiner*—William M. Shoop, Jr.
*Assistant Examiner*—Peter Ganjian
*Attorney, Agent, or Firm*—Eckert Seamans Cherin & Mellott

[57] ABSTRACT

An antitheft device is provided for a vehicle such as a tractor/trailer combination, with an engine operable to develop pneumatic pressure in a reservoir during operation of the engine, and a pneumatic conduit leading from the reservoir to an operational load, preferably a brake release mechanism. The antitheft device preferably has at least two controllable valve along the pneumatic conduit, each with at least two positions including a first position at which the pneumatic conduit is open through the valve from the reservoir to the operational load, and a second position at which the fluid conduit is closed between the reservoir and the load by the valve means to disable the operational load. Air pressure is diverted at the valve to a branch coupling the reservoir through to an alarm such as an air horn. The antitheft device can be included in a tractor or a trailer, and preferably valves and alarms are provided in both. In the alarm state, a vent depressurizes the pneumatic system sufficiently to visibly deactivate air release switches and thus further prevents any possibility of unlocking the brakes.

15 Claims, 5 Drawing Sheets

PNEUMATIC ANTITHEFT APPARATUS WITH ALARM

CROSS REFERENCE TO RELATED APPLICATION

This is a Continuation-in-Part of application Ser. No. 08/389,708, filed Feb. 2, 1995, now abandoned.

BACKGROUND OF THE INVENTION

1. Field of the Invention

The invention relates to the field of antitheft devices for vehicles, and in particular concerns an antitheft device for vehicles having pneumatic systems powered by an engine, such as the pneumatic brake systems of trucks. According to the invention, two key operated valves route pneumatic pressure either to the brake system for releasing the brakes, or to a venting conduit that is also coupled to a pneumatic alarm such as an air horn. If the engine is started with the valve in its protective position, the parking brakes cannot be unlocked due to air being blocked off, and the build up of air pressure being released through a second valve that goes to the airhorn and a blow off valve. The invention is especially applicable to either or both of the tractor and trailer portions of tractor/trailer combinations.

2. Prior Art

It is known to enable or disable operation of a vehicle by means of a controllable valve inserted in series with a critical fluid supply line, such as a hydraulic brake line. Examples are disclosed, for example, in U.S. Pat. Nos. 3,800,279—Thompson; 4,495,910—Taylor; 4,546,846—Myers; and 4,633,686—Carr. Thompson and Myers employ electrical and mechanical means to achieve an interlock for preventing unauthorized operation of a vehicle. Taylor inserts a manually operated valve in a hydraulic power conduit. Carr inserts a manual valve in the brake line. Each of these devices provides protection from theft by disabling the function associated with the fluid line using a key operated valve for blocking the conduit, and enabling the function by permitting fluid or fluid pressure to be coupled through the conduit.

It is generally advantageous in an antitheft device to minimize the complexity of conduits, valves and electrical or mechanical interlocks and mechanisms. This is true for reasons of durability, operational dependability and expense. Although a complicated mechanism may provide more functions than a simpler one, the simpler one is preferred, provided it is effective.

U.S. Pat. No. 3,585,327— Farmery discloses a warning interlock associated with the pneumatic brake system of a truck such as a tractor/trailer combination. In tractor/trailer combinations and certain other vehicles, the parking brake mechanism is powered when the vehicle is operative, to release the brakes. In the absence of such power the brakes engage. Typical brake actuator mechanisms have springs that urge the brakes to engage. Pneumatic pressure is developed from a compressor coupled to the engine. When operating the vehicle, dashboard control valves are operated manually to apply the pressure to pneumatic cylinders that oppose the spring bias of the brake actuators. When sufficient pressure is available in the vehicle's fluid pressure operated system and is coupled through the dashboard controls, the pneumatic cylinders overcome the spring bias and release the brake actuators. When the vehicle is not operating (e.g., when the engine is off and/or the fluid pressure reservoir is vented), the brakes engage. In addition, the dashboard control valves automatically decouple the compressor from the brake lines if the pressure falls below a threshold pressure needed by the control valves to remain engaged. This provides a parking brake function with safety and antitheft aspects.

Typically it is possible to move a vehicle such as a semi-trailer when empty even when the parking brakes are engaged, although this may stress the trailer and the tractor pulling it, due to drag produced by the brakes. An operator may inadvertently operate a vehicle when the brakes are engaged, for example if the pneumatic system or its control valves fail, or if the pneumatic system is not coupled properly to the trailer brakes, or otherwise is disrupted. According to Farmery, a distensible cylinder is coupled to the brake system. An electrical limit switch responsive to the cylinder operates a warning light in the tractor to signal that sufficient pneumatic pressure is not being applied to release the brakes. This warns the operator if operation is attempted while the brakes are engaged, to prevent damage to the tractor or trailer.

The parking brake function as described has inherent safety and antitheft aspects. The parking brake prevents accidental movement of the tractor and/or trailer. However, a typical tractor is powerful enough to move the trailer when empty even if the coupling between the tractor pneumatic system and the trailer brake lines is switched off and the parking brake remains engaged.

Although the brake systems of the tractor and trailer are physically separated, they function together because they are pneumatically coupled by means of a connector, sometimes referred to by the tradename GLADHANDS. The brake systems comprise an emergency brake system and a service brake system. The service lines work in response to activation of the brake pedal, that is, when the driver desires to slow down or stop. Upon application of pressure to the brake pedal, a metering valve allows air pressure from the air tanks of the truck to travel through the foot brake valve through the brake lines of the service system and to the service system components in the brake chambers. The air passing through the service lines puts pressure on the brake shoes so that they engage the brake drum.

The second brake system, the emergency brake system, remains devoid of pressurized air until a dashboard brake release valve is activated. Upon activation of the dashboard brake release valve, air travels through the emergency brake system which releases the truck's maxi brakes and charges the air reservoirs for the service brake system in order for them to function.

According to an aspect of the present invention the antitheft aspects of a pneumatic braking system are enhanced by including 2 manual key-operated blocking valve in the pneumatic line. Even if an unauthorized person is successful in starting the engine and developing pneumatic pressure, the brakes remain locked. However, since it remains possible for an unauthorized person to move an empty trailer having locked brakes, at least for a distance sufficient to escape with the vehicle, the trailer or its contents, according to a further aspect of the invention, the blocking valve is arranged in a tee configuration and in the locking position of the valve vents air from the pneumatic supply. Part of the air operates an air horn alarm coupled to the venting conduit. This is effective for alerting an operator if operation is attempted inadvertently with the brakes locked, and also for alerting nearby persons in the event that an unauthorized person attempts to release the brakes move a truck or similar vehicle. The antitheft system and alarm can be coupled to either tractors and trailers, and preferably both, whereby the brakes of a protected trailer can remain locked, and an alarm sounded, even if a thief couples a second tractor to the trailer.

SUMMARY OF THE INVENTION

It is an object of the invention controllably to block an operational fluid conduit of a vehicle using two valves each with at least two positions. One valve blocks the air to the fluid conduit, and the other valve diverts air to an alarm, such as an airhorn, and to a blow-off vent or valve.

It is another object to block a pneumatic conduit between a source of pneumatic pressure and a brake release mechanism using at least two valves defining a tee configuration for coupling the source either to the brake release mechanism or to a pneumatic horn.

It is also an object of the invention to provide such a valve in the form of a conveniently installed manual key lock valve and connection that are readily placed along the pneumatic lines leading among the source, brake release mechanism and air horn of a tractor/trailer combination.

It is a further object to provide an inexpensive and durable antitheft device and alarm, that require only minimal alterations to a vehicle such as a tractor/trailer combination, and cause only minimal inconvenience to an authorized operator.

These and other objects are accomplished by an antitheft device for a vehicle such as a tractor/trailer combination, with an engine operable to develop pneumatic pressure in a reservoir during operation of the engine, and a pneumatic conduit leading from the reservoir to an operational load, preferably a brake release mechanism. The antitheft device has at least two controllable valves along the pneumatic conduit, each with at least two positions. The first valve includes a first position at which the pneumatic conduit is open through the valve means from the reservoir to the operational load, and a second position at which the fluid conduit is closed between the reservoir and the load by the valve means, to disable the operational load. The other valve includes a first position in which air pressure is diverted to a branch coupling the reservoir through to an alarm, such as an air horn, and to a blow off valve or vent, and a second closed position. Preferably, the device is applied to tractor/trailer combinations, both the tractor and the trailer being independently equipped for controlled coupling of the pneumatic line and for operation of an air horn or similar pneumatically operated alarm.

According to one aspect of the invention, when the device is in an alarm state, a vent depressurizes the pneumatic system sufficiently to deactivate air release switches and thereby further prevent any possibility of operating the vehicle. The depressurizing accomplished by the vent also causes the alarm to cease sounding after a predetermined time interval, as the available pressure drops below a holding pressure of a dashboard control valve.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE PREFERRED EMBODIMENTS

Figure 1:
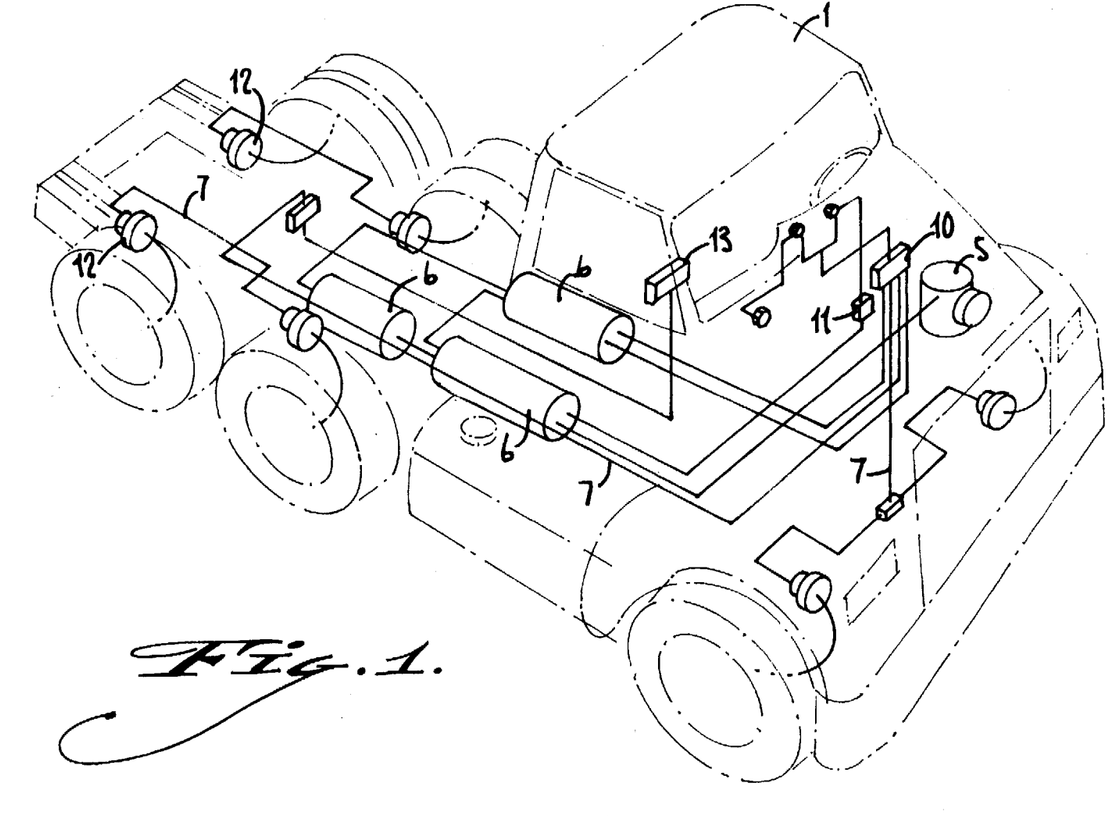
FIG. 1 is an isometric view showing the pneumatic braking system of a conventional tractor or cab portion of a tractor/trailer combination, the braking system being shown in solid lines and the remainder of the tractor in phantom.

FIG. 1 shows certain operative portions of the tractor or cab portion of a tractor/trailer combination. The cab 1 has a pneumatic braking system which is configured in a preferably substantially leak-free circuit and includes a reservoir filled by a compressor associated with the tractor engine, operable to hold a supply of pressurized air. The brake system has various fluid conduits, reservoirs, valves, brake release mechanisms and brake mechanisms which are interconnected to form the brake circuit.

Pressurized air is supplied from air compressor 5, powered when the engine is powered. The air compressor is coupled to an air governor that activates and deactivates the compressor to maintain a predetermined pressure in the reservoir. The air governor activates the compressor when the system air pressure drops below a minimum operating pressure and deactivates the compressor when the system air pressure reaches a maximum operating pressure, typically 120 psi. Over-pressure vents and the like can be included in known manner.

In the embodiment shown, air compressor 5 is coupled to an inlet of at least one reservoir or accumulator 6 via conduits 7. The accumulators store a relatively large volume of pressurized air, compared to the volume of pressurized air contained in the conduits. The accumulators thus act as a mechanical storage means to deliver on demand a relatively steady pressure at their outlet.

This accumulated air supply is coupled via conduits 7 to a valve means forming a tee configuration whereby the air supply is either coupled for normal operation to operate brake release cylinders 12, or to a pneumatic alarm such as an air horn. In the protective position of the valve means, when the vehicle is not operational and reservoirs 6 are vented, the brakes are locked mechanically. If the vehicle is operated with the valve means in the protective position, the brakes remain locked and the air from reservoirs 6 is coupled to the air horn or other pneumatic alarm. Moving the valve means from the protective position to the operational position removes the alarm from the circuit and couples the pneumatic reservoir to the brake mechanism in a normal manner.

The valve means can include a single diverting valve having one input coupleable to either of two alternative outputs, or two stop valves that are coupled in a tee arrangement by conduits. The use of two stop valves, as opposed to one diverting valve, gives the operator the option of disabling the alarm while retaining the function of disabling release of the brakes.

Figure 2:
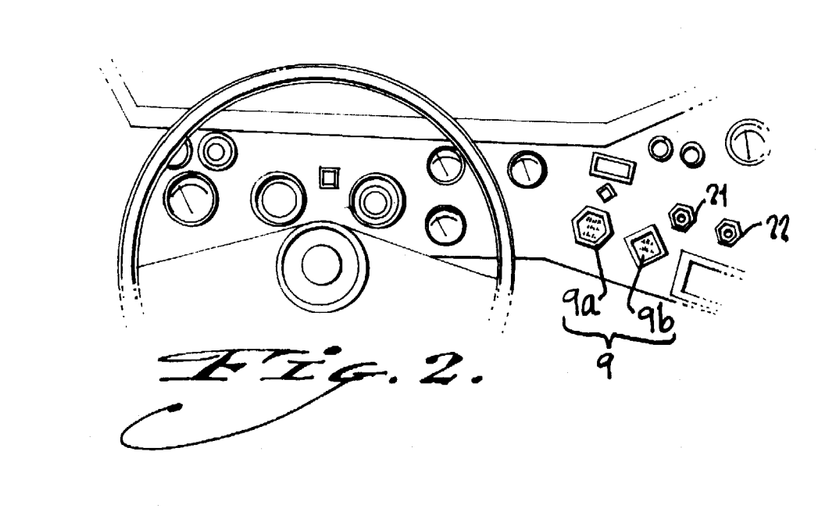
FIG. 2 is a partial elevation view showing a portion of the dashboard of a tractor or cab, including certain controls for valve means according to the invention.

A conventional tractor or cab typically has valves that independently control coupling of the vehicle pneumatic system (i.e., the pneumatic reservoirs) to the brake releases for the tractor and trailer, respectively. However, they are not key operated and can be freely set in a parking brake (blocking) position or in an operational (non-blocking) position. The antitheft system of the invention can be associated with the pneumatic lines involving these valves. As shown in FIG. 2, the valve means can include two mechanical stop valves 9, for example ball valves, which have manual controls on the tractor dash. The ball valves are on/off valves that control coupling of the accumulated air supply in reservoir 6 and the trailer brake systems.

When the cab is parked, both the tractor air valve 9b and trailer air valve 9a typically are turned off. In this respect, the term "on" is used herein with respect to ball valves to mean that the valve inlet and valve outlet are in fluid communication, and the term "off" means that the valve inlet and valve outlet are not in fluid communication. When the cab is the driven without a trailer, the tractor air valve 9b is turned on and the trailer air valve 9a is turned off. When the tractor is coupled to a trailer, the tractor and trailer air valves both are turned on.

Accumulated air supply from the tractor air valve is routed via conduits 7 to a brake valve 10 which is coupled to the brake pedal 11 in the cab and enables driver control of the brake release to achieve a range of braking pressures, up to a maximum equal to full application of the parking brake. The brake valve has at least one an inlet and at least one outlet and is normally on. The accumulated air supply coupled to the brake valve inlet flows through the brake valve to the brake valve outlet. When the brake pedal is depressed, the brake valve is progressively turned off. Excess pressurized air is vented to the atmosphere.

Brake release cylinders 12 are located at each wheel assembly and are coupled to the brake valve 10 via conduits 7. The brake release mechanisms are actuated by pressurized air. The brake release cylinders operate the tractor brakes 15 (FIG. 4a–4b) and are normally engaged (i.e., mechanically engaging opposed braking surfaces under spring pressure). The same sort of brake release mechanisms 12 are provided in the trailer, which is coupled across the articulation with the trailer by hoses. When air pressure is directed to the brake release mechanisms, the brakes 15 are released and the tractor or trailer can roll (FIG. 4c).

Figure 5:
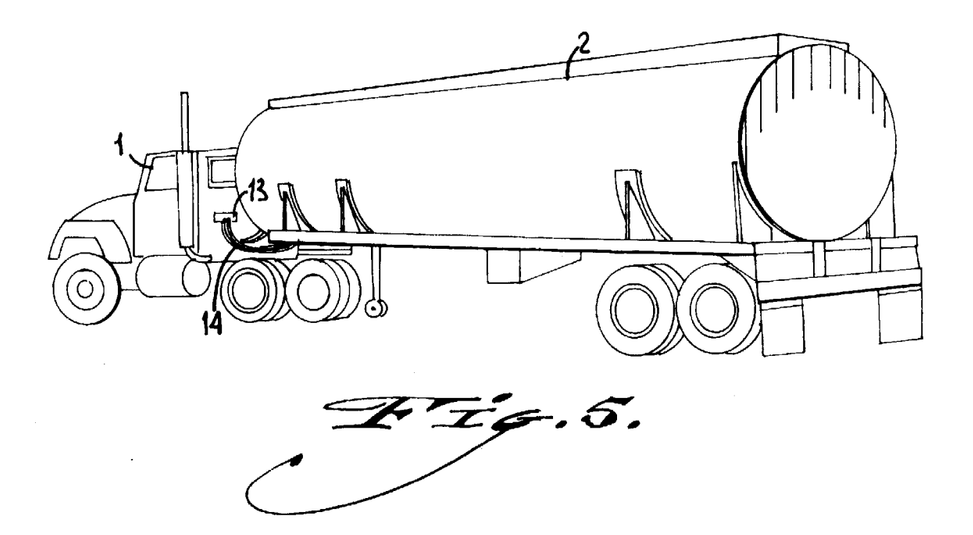
FIG. 5 is an isometric view showing a tractor/trailer combination coupled by pneumatic trailer brake hoses, and including in the trailer a brake release and alarm means in accordance with the invention.

Accumulated air supply from the trailer air valve 9a is routed via conduits 7 to a junction block 13 mounted on the exterior of the cab. The junction block is used to couple the trailer brake system to the cab. FIG. 5 shows a typical tractor trailer having a cab 1 and a trailer 2. The trailer braking system is coupled to the cab via hoses 14. The trailer likewise has conduits, brake release mechanisms and brakes which are functionally equivalent those discussed above.

The tractor and trailer brakes are intended to function identically. During normal operation, when the brake pedal 11 is depressed, the brake valve is progressively turned off. Pressurized air is vented from the brake valve and the air pressure at the brake release mechanisms decreases. As the air pressure at the brake release mechanisms decreases, the brakes are applied. Once the brake pedal is released, air is no longer vented from the brake valve and the compressor is activated until maximum operating pressure is reached.

Figure 3:
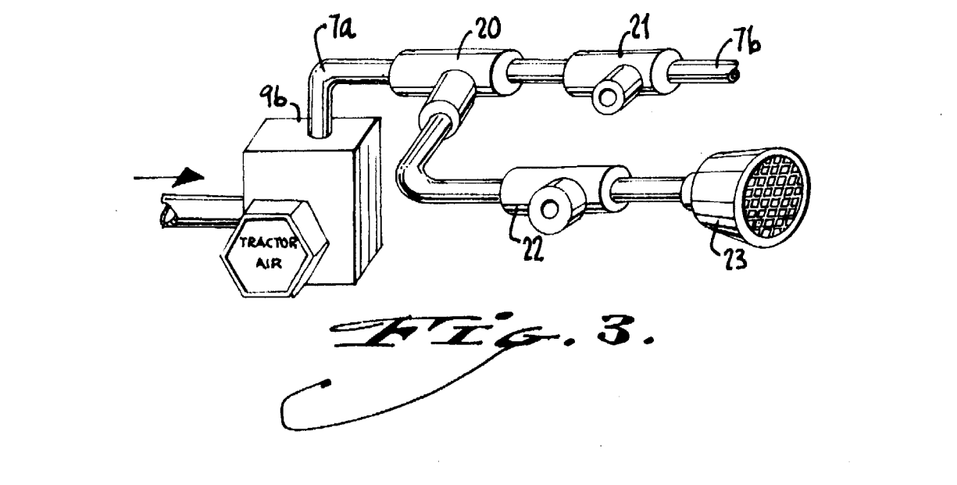
FIG. 3 is an isometric view of an embodiment in accordance with the invention having a key operated valve arrangement and an air horn.
Figure 6:
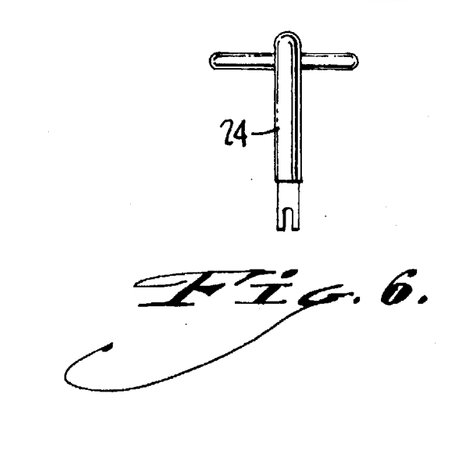
FIG. 6 is a front view of an embodiment of a valve key according to one embodiment of the invention.
Figure 7:
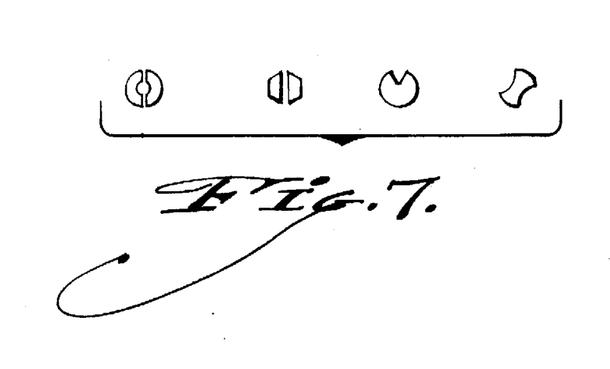
FIG. 7 is an end view showing four alternative embodiments of a non-round key profile for use in accordance with the invention.

According to the invention, a key operated tee valve means is inserted into the pneumatic brake lines as shown in FIG. 3. A tee fitting 20 is coupled to a conduit between the tractor air valve 9b and the brake release mechanism. A first leg of the tee fitting is coupled to the conduit 7a leading to the tractor air valve. A second leg of the tee fitting is coupled to a first key operated valve 21 which is coupled to the conduit 7b leading the brake release mechanisms 12. A third leg of the tee fitting is coupled to a second key operated valve 22 which is coupled to an air horn 23. The key operated valves are standard on/off ball valves operated by a key. FIG. 6 shows an embodiment of a key 24 suitable for operating the key operated valves, and FIG. 7 shows various non-round key profiles that can be used.

The key operated valves can be physically located anywhere on the tractor or trailer, and can be exposed or concealed. In one embodiment the key operated valves are located in the dash as shown in FIG. 2, similar to the existing stop valves 9a, 9b, but operated by a key. Alternatively, the key operated valves can be placed where known only to authorized operators, such as in a door jamb, behind an edge of the body, near the hose hookups for the trailer, etc. Similar valves can be placed on the trailer, for example in or under the structural side rails.

Figure 8:
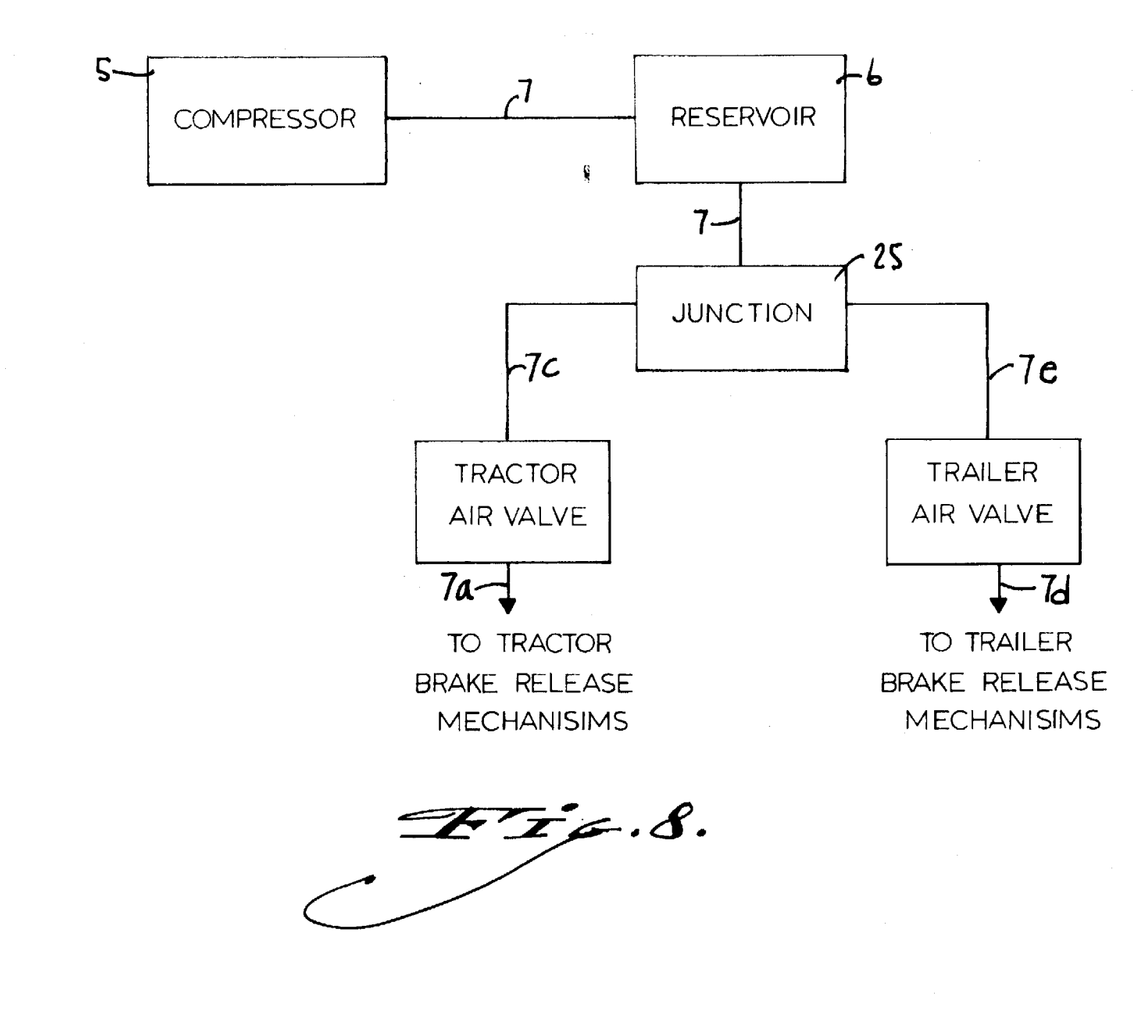
FIG. 8 is a schematic block diagram of a pneumatic braking system in accordance with the invention.

FIG. 8 shows a schematic diagram of a pneumatic braking system. Compressed air is supplied by the compressor 5 to reservoir 6 via conduit 7. The compressed air flows from the reservoir to a junction 25. Conduits 7c and 7e carry the compressed air to the tractor and trailer air valves 9b and 9a respectively. The key operated tee valve means can be inserted in line with conduit 7a for the tractor (as shown in FIG. 3) and/or conduit 7d for the trailer. Alternatively the key operated tee valve means can be inserted in line with conduits 7c and/or 7e.

Figure 4A:
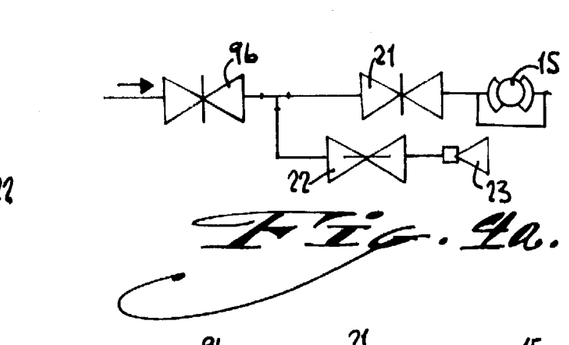
FIG. 4a is schematic diagram in accordance with the invention showing the valve configuration for an alarm-on position of the valve means.
Figure 4B:
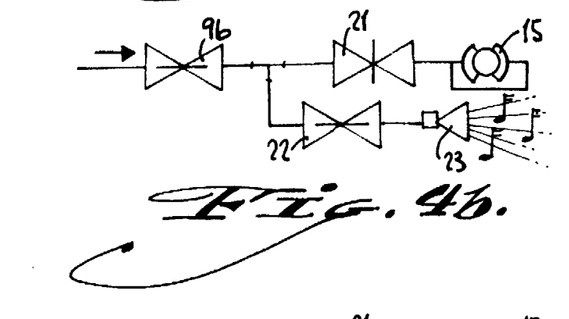
FIG. 4b is schematic diagram showing the valve means in the alarm-on position during an alarm condition.
Figure 4C:
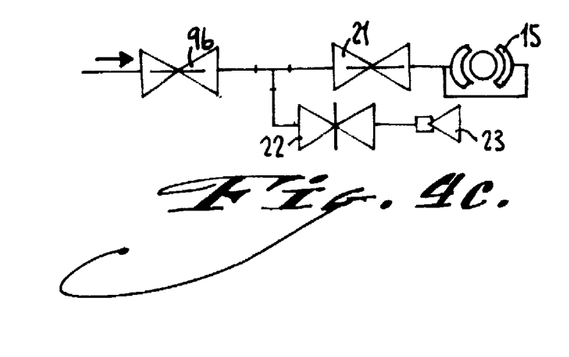
FIG. 4c is schematic diagram showing the valve means in an alarm-off position.

Operation of the pneumatic antitheft device is shown schematically in FIGS. 4a–4c which are representative of a system that can be coupled to the tractor or the trailer, and preferably is included in both, with separate valves and alarm means for the tractor and trailer, respectively. As shown in FIG. 4a, when the truck is parked the tractor air valve 9b is turned off via controls mounted to the tractor dash (FIG. 2). The two key operated valves 21, 22 are arranged in the alarm on position; the first key operated valve 21 with conduit 7b leading to the brake release mechanisms is turned off; the second key operated valve coupled to air horn 23 is turned on. An alarm condition is shown in FIG. 4b. When the tractor air valve 9b is turned on, pressurized air is routed through the second valve 22 to the air horn 23. The air horn 23 vents the pressurized air to the atmosphere which prevents air pressure from building to a sufficient level to disengage the brakes and also generates an audible alarm signal.

As shown in FIG. 4c, when the truck is in operation, the tractor air valve 9b is turned on. The two key operated valves are arranged in the alarm off position; the first key operated valve 21 with conduit 7b leading to the brake release mechanisms is turned on; the second key operated valve coupled to air horn 23 is turned off. Pressurized air is routed along the normal path from the air supply to the brake release mechanisms. The system functions identically when applied to a trailer however the tractor air valve 9b as shown in FIGS. 3 and 4a–4c is replaced by the trailer air valve 9a.

FIG. 3 shows two independently controllable valves 21, 22, however a single two-position diverter valve mechanism can be used in the alternative. The valve must have a first position in which the pressurized air supply is open through the valve to the brake release mechanisms, and a second position in which the pressurized air supply is closed off from the brake release mechanisms and open to air horn. By using two stop valves rather than one diverter valve, it is possible to employ the brake lockout function without using the audible alarm.

In the drawings, the key operated valves are shown as being manually operable via a key. However, automatically operated valves can also be used, including those suitable for integration with various types of electronic vehicle alarm systems. Accordingly, the term "key operated" should be construed to include devices that include code entry devices, solenoid operated valves and the like, which include security functions to prevent operation by unauthorized persons.

Figure 9A:
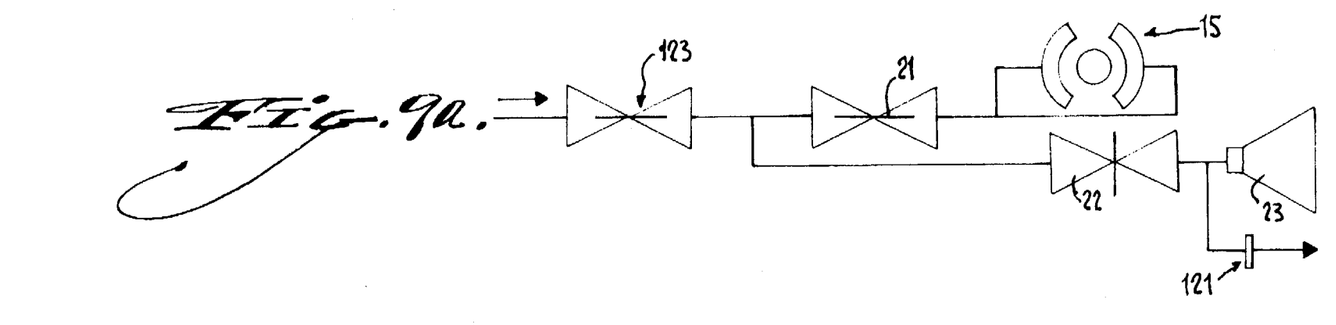
FIGS. 9a–9c are schematic diagrams showing another embodiment of the present invention in various stages of activation.
Figure 9B:
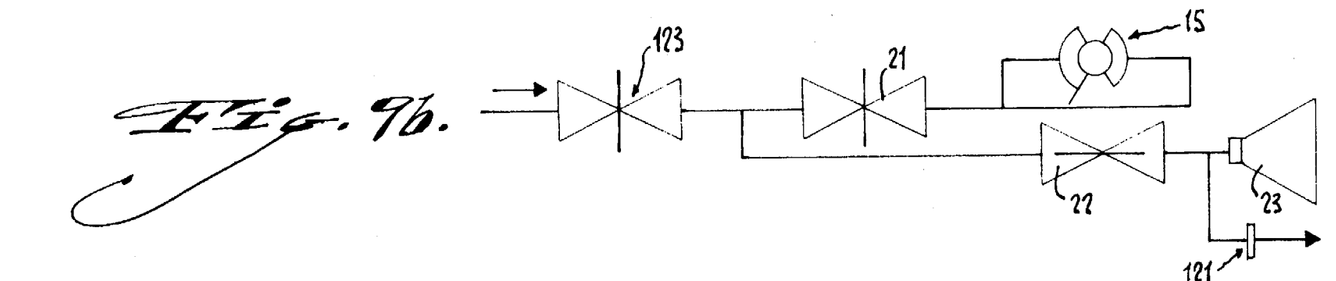
Figure 9C:
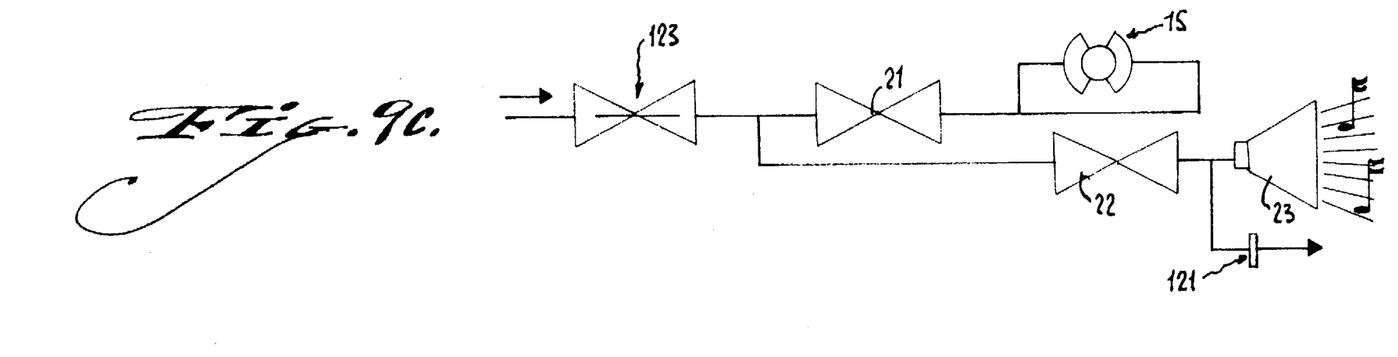

An alternative embodiment of the pneumatic antitheft device of the present invention is shown in a series of schematics in FIGS. 9a–9c, using symbols and reference numerals similar to those of FIGS. 4a–4c. This embodiment takes advantage of dashboard controls requiring a minimum pressure to remain engaged, and includes venting of the pneumatic system through a venting conduit coupled to the antitheft/alarm valve. In its "unarmed" or "off" state shown in FIG. 9a, valve 22 is closed and valve 21 is open, allowing the brakes 15 to be released by switch 123 and otherwise operated. When the device is "armed" as shown in FIG. 9b, valve 21 is closed to prevent air from reaching and unlocking brakes 15, and valve 22 is open to create a circuit through the valve 22, through air horn 23 and vent 121. When an alarm condition occurs, as shown in FIG. 9c, pressurized air is routed through the valve 22 and through the air horn 23 and the vent 121.

This embodiment of the invention is particularly useful in certain hydraulic truck brake systems. For example, when the truck brake system has an air release switch 123 for the tractor or trailer brakes, the switch 123 disengages the brakes so long as the pressure in the system exceeds a predetermined threshold pressure, generally 60 psi. Switch 123 may be of any suitable form but is preferably a button on the truck dash which is spring biased in the open or "up" position when the brakes are locked, and held closed in the "down" position when the brakes are released by the presence of air above the threshold pressure in the system.

A truck operator wishing to activate the truck brakes under normal conditions will start the truck's engine and push down on or otherwise activate the switch 123 to disengage the brakes and allow the truck to be moved. The switch 123 remains in the "down" or activated position so long as air pressure in the system exceeds the threshold. Switch 123 pops "up" when the pressure falls below the threshold, and remains off until manually pressed down again. A person attempting to steal a tractor and/or trailer is likely to be deterred by the visible deactivation or "popping out" of the switch 123, because that position of switch 123 is likely to be associated with deactivation of the brake release and an immovable truck. Conversely, an experienced truck thief seeing the switch 123 remain in the activated or on position may continue or redouble efforts to move the truck since the switch 123 in its activated state indicates sufficient pressure may be developing in the pneumatic system to unlock the brakes.

The embodiment shown in FIGS. 9a–9c causes switch 123 to "pop out" or deactivate under alarm conditions, thereby visibly deterring the would-be thief, because vent 121 drains sufficient air out of the system so that the system pressure is below the threshold value of switch 123, whereas the air horn 23 alone would not. Air horn 23, even when activated in an alarm condition, generates substantial flow resistance or "back pressure," such that switch 123 would remain "down" or activated without vent 121 venting air out of the system. Without vent 121 quickly removing the back pressure in the circuit of air horn 23, would-be thieves, thinking there is sufficient pressure in the system to unlock the brakes, may continue to attempt to move the vehicle notwithstanding the alarm noise. The vent 121 preferably admits sufficient flow to depressurize the system from operational pressure (120 psi) to atmospheric pressure in 30 seconds or less.

In addition, without venting through vent 121, it is possible that the back pressure across air horn 23 can be conveyed by leakage through valve 21 into the circuit controlling brakes 15. If the resulting buildup of pressure at brakes 15 exceeds the threshold pressure of the air release switch, then the brakes may be released, defeating the deactivation of the brakes by valve 21. The quick venting accomplished by this embodiment quickly eliminates back pressure in the circuit including air horn 23, and thereby also eliminates the possibility that such back pressure will pass through valve 21 and deactivate brakes 15. As a result, air horn 23 sounds so long as an attempt is made to develop brake releasing pressure, but it is not possible to build up operational pressure, regardless of how long operation is attempted.

Vent 121 may be suitably selected so that the air pressure at air horn 23 falls below the amount needed to sound the air horn after a predetermined time interval. In this way, if operation is attempted and then stopped, air horn 23 nevertheless remains sounding for a time. Preferably, this time is long enough to deter the would-be thief but not so long as to create a nuisance to others, as would result if the horn sounded indefinitely while the engine of the tractor was left running.

In one preferred application, valves 21 and 22 are installed in the emergency braking system of a tractor trailer combination. In this application, valve 22 is installed toward the front of the trailer and is in pneumatic communication with switch 123. To arm the antitheft device, valve 22 is opened, so that if a would-be thief tries to release the brakes by depressing switch 123 on the dashboard of the tractor, sufficient air pressure is not available to release the brakes because the air activates the airhorn and exits through the blow off vent or valve 121.

In addition, when the antitheft device is in its armed state in this application, valve 21 is closed as shown in FIG. 9b, so that no air can get past it and work its way back to release brake system 15.

According to this application, in order to operate the tractor-trailer combination, valves 21, 22 need to assume the positions shown in FIG. 9a. That is, valve 22 needs to be closed so that air pressure is not lost through vent 121 and airhorn 23, and valve 21 is opened to permit the brakes of system 15 to be released for operation by the service line system.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. An antitheft device for a vehicle's pneumatic system having a fluid conduit leading from a source of pneumatic pressure to a brake release mechanism, the source providing pneumatic pressure to the brake release mechanism to permit operation of the vehicle, the antitheft device comprising:

at least one key-operated manually controllable valve means disposed along the fluid conduit, the valve means having at least two positions including a first position at which the fluid conduit is open through the valve from the source to the brake release mechanism for permitting operation of the vehicle with the valve means in the first position, and a second position at which the fluid conduit is closed from the source to the brake release mechanism for disabling operation of the brake release mechanism with the valve means in the second position, said valve means further comprising a branch to which the source is coupled by the valve means in said second position;

a pneumatic alarm coupled to the branch;

a switch operatively connected to the pneumatic system and having an activated position for releasing the pneumatic pressure from the source and a deactivated position for preventing flow from the source, the switch being held in the activated position so long as a predetermined threshold pressure is available from the source and remaining deactivated when the pressure from the source is below the threshold pressure;

a vent coupled to the branch and in pneumatic communication therewith, the vent sized to depressurize the system below the threshold pressure within a predetermined time interval;

the pneumatic alarm sounding and the vent depressurizing the pneumatic system below the threshold pressure in response to attempted operation of the vehicle with the valve means in the second position, whereby the brake release mechanism is disabled and the switch assumes the deactivated position.

2. The antitheft device of claim 1, wherein the switch is mounted within the vehicle cab and includes means to physically move between the activated and deactivated positions, thereby making the two positions visually distinguishable to an occupant of the cab.

3. The antitheft device of claim 1, wherein the valve means comprises a tee valve having an input coupled to the source and two outputs coupled respectively to the brake release mechanism and to the branch.

4. The antitheft device of claim 1, wherein the valve means comprises two on/off blocking valves coupled to the source, one of the valves being coupled to the brake release mechanism and the other of the valves being coupled to the pneumatic alarm and the vent.

5. The antitheft device of claim 1, wherein the air horn ceases to sound below a predetermined pressure, and wherein the vent is sized to bring the pneumatic system below said predetermined pressure within a predetermined time interval.

6. In combination, a vehicle and an antitheft device, comprising:

an engine within the vehicle operable to develop pneumatic pressure in a reservoir during operation of the engine, brakes and a pneumatic conduit leading from the reservoir to a brake release mechanism operable to disengage the brakes when coupled to said pneumatic pressure for permitting operation of the vehicle;

the antitheft device having at least one controllable valve means disposed along the pneumatic conduit, the valve means being manually adjustable using a key, between at least two positions including a first position at which the pneumatic conduit is open through the valve from the reservoir to the brake release mechanism, such that the brakes are released for operation of the vehicle with the valve means in the first position, and a second position at which the fluid conduit is closed between the reservoir and the brake release mechanism to disable the brake release mechanism and prevent operation of the vehicle, said valve means further comprising a branch to which the reservoir is coupled through the valve means in said second position;

a pneumatic alarm coupled to the branch;

a switch in pneumatic communication with the conduit and between the reservoir and the brake release mechanism, the switch having an activated position for releasing the pneumatic pressure from the reservoir and a deactivated position for preventing flow from the reservoir, the switch remaining in the activated position after manual activation so long as a predetermined threshold pressure is available from the reservoir and remaining deactivated when the pressure from the reservoir is below the threshold pressure;

a vent coupled to the branch and in pneumatic communication therewith, the vent sized to depressurize the reservoir below the threshold pressure within a predetermined time interval;

the pneumatic alarm sounding and the vent depressurizing the reservoir below the threshold pressure in response to attempted operation of the vehicle without first moving the valve means to the first position using the key, whereby the brake release mechanism is disabled and the switch assumes the deactivated position.

7. The combination of claim 6, wherein the vent is sized to have the predetermined time interval be about 30 seconds.

8. The combination of claim 6, wherein the valve means comprises two on/off blocking valves coupled to the reservoir, one of the valves being coupled to the brake release mechanism and the other of the valves being coupled to the pneumatic alarm and the vent.

9. The combination of claim 8, wherein the alarm means comprises an air horn which ceases to sound below a predetermined pressure, and wherein the vent is sized to bring the pressure in the reservoir below said predetermined pressure within a predetermined time interval.

10. The combination of claim 9, wherein the vehicle comprises a tractor/trailer combination and the brake release mechanism is arranged to release spring loaded brakes of a trailer.

11. The combination of claim 10, wherein the antitheft device is coupled to a tractor of the tractor/trailer combination.

12. The combination of claim 10, wherein the antitheft device is coupled to a trailer of the tractor/trailer combination.

13. The combination of claim 10 further comprising a coupling between the tractor and the trailer, and further comprising two of said antitheft devices, one being coupled to a tractor of the tractor/trailer combination between the source and the coupling and the other being coupled to a trailer of the combination between the coupling and the brake release mechanism.

14. The combination of claim 6, wherein the valve means is concealed.

15. The combination of claim 6, wherein the valve means is at least partly disposed at a dashboard of the vehicle for access by authorized operators.

* * * * *